US012432838B2

(12) United States Patent
Wei et al.

(10) Patent No.: US 12,432,838 B2
(45) Date of Patent: Sep. 30, 2025

(54) METHOD OF EVALUATING LIGHTING QUALITY IN A GEOGRAPHIC REGION HAVING A PLURALITY OF LUMINAIRES ARRANGED THEREIN AND A ROAD LIGHTING SYSTEM

(71) Applicant: SIGNIFY HOLDING B.V., Eindhoven (NL)

(72) Inventors: Yingdong Wei, Shanghai (CN); Xiaoyan Zhu, Shanghai (CN); Lei Feng, Shanghai (CN); Jaya Karthik, Bangalore (IN)

(73) Assignee: SIGNIFY HOLDING B.V., Eindhoven (NL)

( * ) Notice: Subject to any disclaimer, the term of this patent is extended or adjusted under 35 U.S.C. 154(b) by 145 days.

(21) Appl. No.: 18/270,762

(22) PCT Filed: Jan. 4, 2022

(86) PCT No.: PCT/EP2022/050051

§ 371 (c)(1),
(2) Date: Jul. 3, 2023

(87) PCT Pub. No.: WO2022/148737

PCT Pub. Date: Jul. 14, 2022

(65) Prior Publication Data

US 2024/0147598 A1 May 2, 2024

(30) Foreign Application Priority Data

Feb. 26, 2021 (EP) .................................... 21159482

(51) Int. Cl.

| | |
|---|---|
| ***H05B 45/20*** | (2020.01) |
| ***H05B 45/22*** | (2020.01) |
| ***H05B 47/20*** | (2020.01) |

(52) U.S. Cl.
CPC .................................... *H05B 47/20* (2020.01)

(58) Field of Classification Search
CPC ...... H05B 47/00; H05B 47/10; H05B 47/105; H05B 47/19; H05B 47/1985; H05B 47/20;

(Continued)

(56) References Cited

U.S. PATENT DOCUMENTS

| | | | |
|---|---|---|---|
| 10,791,607 | B1 | 9/2020 | Modestine et al. |
| 2009/0222223 | A1 | 9/2009 | Walters et al. |

(Continued)

FOREIGN PATENT DOCUMENTS

| | | | |
|---|---|---|---|
| CN | 108055738 | A | 5/2018 |
| CN | 108391354 | A | 8/2018 |

(Continued)

OTHER PUBLICATIONS

Djuretic Andrej, et al: "Actual Energy Savings When Replacing High-Pressure Sodium With LED Luminaires in Street Lighting", Energy, Elsevier, Amsterdam, NL, vol. 157, May 28, 2018, pp. 367-378.

*Primary Examiner* — Thai Pham

(57) ABSTRACT

A method of and a computing device for evaluating lighting quality in a geographic region having a plurality of luminaires arranged therein and a road lighting system are disclosed. Each luminaire in the geographic region comprises a tilt sensor arranged for obtaining a tilt angle of the luminaire. The method is performed by a computing device and comprising the steps of: receiving tilt angles of the plurality of luminaires obtained by tilt sensors of the plurality of luminaires, and evaluating lighting quality in the geographic region with reference to a number of parameters derived from the received tilt angles of the plurality of luminaires.

12 Claims, 3 Drawing Sheets

(58) Field of Classification Search
CPC ....... H05B 47/22; H05B 47/235; F21V 23/00; F21V 23/0492
See application file for complete search history.

(56) References Cited

U.S. PATENT DOCUMENTS

| | | | | |
|---|---|---|---|---|
| 2012/0072138 | A1 | 3/2012 | Walters et al. | |
| 2013/0211608 | A1 | 8/2013 | Farrell et al. | |
| 2020/0146132 | A1* | 5/2020 | Chen | H05B 45/22 |
| 2020/0344863 | A1* | 10/2020 | Etorre | H05B 47/175 |
| 2023/0138515 | A1* | 5/2023 | Wright | G01M 3/3272<br>702/34 |
| 2023/0209692 | A1* | 6/2023 | Lang | H05B 47/22<br>324/762.07 |

FOREIGN PATENT DOCUMENTS

| | | | | |
|---|---|---|---|---|
| GB | 2403357 | A | 12/2004 | |
| WO | 2016016838 | A1 | 2/2016 | |
| WO | WO-2019134899 | A1 * | 7/2019 | F21S 8/086 |

* cited by examiner

Legend:
10 – lighting system
11 – computing device
12 – tilt sensors
13 – driver
14 – communication unit
15 – human-machine interface
111 – lighting unit
112 – tilt sensor
114 – communication unit
115 – connection
116 – connection
117 – long range communication
118 – connection
130 – network

METHOD OF EVALUATING LIGHTING QUALITY IN A GEOGRAPHIC REGION HAVING A PLURALITY OF LUMINAIRES ARRANGED THEREIN AND A ROAD LIGHTING SYSTEM

CROSS-REFERENCE TO PRIOR APPLICATIONS

This application is the U.S. National Phase application under 35 U.S.C. § 371 of International Application No. PCT/EP2022/050051, filed on Jan. 4, 2022, which claims the benefits of Chinese Patent Application No. PCT/CN2021/070683, filed on Jan. 7, 2021, and European 21159482.5, filed on Feb. 26, 2021. These applications are hereby incorporated by reference herein.

TECHNICAL FIELD

The present disclosure generally relates to the field of road or streetlight systems and, more specifically, to a method of monitoring quality in a geographic region having a plurality of luminaires arranged therein and a road lighting system.

BACKGROUND

Outdoor lights such as streetlights or lights in stadiums form an important part of modern cities. In recent years, lighting systems are applied more and more in road or street lighting. Currently, road lighting systems are usually designed and used for the purpose of energy saving and user experience enhancing.

For example, the currently deployed road lighting systems are mainly used for performing tasks including: collecting and summarizing various lighting data such as energy usage, dynamically adjusting lighting levels according to traffic, time, or weather condition to reduce energy use and enhance road safety, and collecting and transmitting non-lighting data to integrate more applications and services into lighting networks.

Road lighting systems generally comprise various sensors arranged for realizing different functions and providing various services. The sensors may comprise illuminance sensors, positioning sensors, tilt angle sensors, electrical sensors, temperature/humidity sensors, noise sensors, and so on. A large variety of information collected by these sensors may be used to achieve various functions, such as traffic surveillance or smart lighting service.

Tilt angle sensors or simply tilt sensors, provided in many outdoor luminaires, are mostly used to report safety issues related to or associated with potentially falling luminaire fixtures or lighting poles.

Lighting quality is a main factor considered in designing road lighting systems. In addition to the reason of striving to provide better visual performance and visual comfort for road users, there are also many specific regulations and standard requirements in terms of lighting quality to which the road lighting systems have to conform. Therefore all these requirements have be considered and met in the process of lighting design and simulation.

However, few tests are made to check whether such requirements are still met after the completion of lighting installation and debugging. Besides, these requirements are rarely evaluated in the entire usage lifetime of the luminaires, despite the fact that the lighting quality of road lighting may no longer meet the requirements due to unexpected luminaire tilt angle changes which may happen in the process of lighting installation or in the later usage lifetime.

Accordingly, there is a need for a road lighting system which can have the lighting quality of each geographic region in the lighting system evaluated in the process of installation and in the usage lifetime after installation and can give alarm or alert if the lighting quality deviates from the specified requirements.

SUMMARY

In a first aspect of the present disclosure, there is provided a method of evaluating lighting quality in a geographic region having a plurality of luminaires arranged therein, each luminaire comprising a tilt sensor arranged for obtaining a tilt angle of the luminaire, the method performed by a computing device and comprising the steps of:

receiving tilt angles of the plurality of luminaires obtained by tilt sensors of the plurality of luminaires, and evaluating lighting quality in the geographic region with reference to a number of parameters derived from the received tilt angles of the plurality of luminaires.

It is the inventor's insight that the lighting quality in a geographic region or area having luminaires or light fixtures installed therein may be evaluated or monitored, after the installation of the luminaires is finished and during the operational lifespan of the luminaires, by using or with reference to tilt angles of the luminaires which are obtained in real-time from tilt sensors or inclinometers installed with the luminaires.

The tilt sensors which are provided in the lighting system for detecting lamp pole toppling and providing alarm if necessary, may also be used to measure tilt angles of the respective luminaires.

The tilt angles measured or detected by the tilt sensors are transmitted to the computing device such as a backend server configured for managing and controlling the plurality of luminaires. The transmission may be done via direct long range communication between each luminaire and the computing device or via one or more proxy luminaire provided with long range communication capability and short range inter-node communication between the luminaires.

The computing device can then evaluate the lighting quality in the geographic region with reference to the received tilt angles, by using an approach of calculating or deriving values of a number of parameters, which are considered when designing the road lighting system, based on the received tilt angles, thereby evaluating or checking the current lighting quality, which is likely to be different from the designed or expected lighting quality.

The method of the present disclosure therefore allows the lighting quality of geographic regions within the road lighting system to be evaluated during the daily operation of the lighting system, regularly at fixed times or occasionally on demand, after the completion of the lighting installation. Thus, impact to the lighting quality caused by tilt angle change of the luminaires, which might be due to for example undesired external force exerted on the luminaires or road settlement, may be detected and corrected if necessary.

The method can prevent unexpected lighting quality deviation from the requirement and ensure maintenance of lighting quality conforming to the various requirement, thereby providing satisfactory illumination performance, achieving good user experience and road safety.

In an example, the number of parameters comprises at least one of the following parameters:

one or more lighting level indicators;

one or more lighting uniformity indicators;

a threshold increment, and a surround ratio.

Parameters considered for the lighting quality when designing the road lighting system normally include lighting level indicators such as luminance and illuminance, uniformity indicators such as average overall uniformity, longitudinal uniformity and so on. The threshold increment and surround ratio may also be considered. A thorough evaluation of the lighting quality based on such parameter are therefore realized.

It can be contemplated by those skilled in the art that particular parameters that can be used for evaluating the lighting quality may vary dependent on requirements as specified by regional standards.

In an example, evaluating lighting quality in the geographic region with reference to a number of parameters derived from the received tilt angles of the plurality of luminaires comprises:

calculating the number of parameters based on the received tilt angles of the plurality of luminaires and road settings and other luminaire installation settings, and comparing the calculated number of parameters with respective reference values of the parameters.

With this approach, the lighting quality that is achieved under the measured tilt angles of the luminaires is evaluated by checking whether the number of lighting quality parameters conform to the desired or reference lighting quality parameters or not.

Thus, the lighting quality parameters, which are directly related to the measured tilt angles, are calculated and then compared with respective reference values of each of the parameters.

This approach provides straightforward and illustrative evaluation in terms of each and every parameter that is used for deciding the lighting quality.

In an example, the geographic settings and other luminaire installation settings are pre-stored in the computing device or available from another device storing the road settings and other luminaire installation settings.

The computing device may be for example a backend server arranged for managing and controlling all luminaires of a lighting system. In this case, the geographic settings and other luminaire installation settings of the luminaires are pre-stored in the computing device and can be used readily.

On the other hand, the computing device may be a separate electronic device specially used for evaluating the lighting quality, for example for on-site purpose. In this case, the geographic settings and other luminaire installation settings may be obtained from for example a backend server which has such information stored therein. This allows more flexibility and any maintenance and adjustment that need to be performed to the luminaires may be done on-site easily.

In an example, the geographic settings comprise at least one of:

a road carriageway number;

a central reserve width; and a number of lanes;

the other luminaire installation settings comprise at least one of:

a mounting height of a luminaire;

a spacing length between two adjacent luminaires; and an overhang length of a luminaire.

These settings can affect the lighting effect in the geographic region and are used in calculating the parameters adopted for evaluating. Depending on the real life conditions of the road under evaluation, different settings may be considered.

In an example, the evaluating step is performed for a number of selected evaluation points in the geographic region.

It can be contemplated by those skilled in the art that the lighting quality in a geographic region can be evaluated at multiple points in the region and then an aggregated lighting quality can be determined based on the multiple evaluation. It therefore allows more precise evaluation result to be achieved.

In an example, the method further comprises the step of sending an alarm when a result of the evaluating step shows that the lighting quality does not meet specified requirements.

It therefore allows the lighting quality to be improved based on the evaluation result which is obtained periodically at fixed times or under special arranged time. The luminaires in the lighting system can therefore throughout their operational lifespan be maintained at the proper position for ensuring good lighting quality.

In a second aspect of the present disclosure, there is provided a road lighting system comprising:

a plurality of luminaires arranged in a geographic region, each luminaire comprising a tilt sensor arranged for obtaining a tilt angle of the luminaire;

a computing device, comprising:

a communication device arranged for receiving the tilt angles of the plurality of luminaires obtained by the tilt sensors;

an evaluating device arranged for evaluating lighting quality in the geographic region with reference to a number of parameters derived from the received tilt angles of the plurality of luminaires.

The lighting system as described above can evaluate the lighting quality in a specific geographic region after the completion of lighting system. It therefore allows the lighting quality of the specific geographic region to be evaluated when necessary, providing up-to-date indication and guidance necessary for operation and maintenance of the lighting system.

In an example, the number of parameters comprises at least one of the following parameters:

one or more lighting level indicators;

one or more lighting uniformity indicators, a threshold increment, and a surround ratio.

In an example, the evaluating device is arranged for evaluating lighting quality in the geographic region by:

calculating the number of parameters based on the received tilt angles of the plurality of luminaires and road settings and other luminaire installation settings, and comparing the calculated number of parameters with respective reference values of the parameters.

In an example, the geographic settings and other luminaire installation settings are pre-stored in the evaluation device or available from another device storing the road settings and other luminaire installation settings.

In an example, the geographic settings comprise at least one of:

a road carriageway number;

a central reserve width; and a number of lanes;

the other luminaire installation settings comprise at least one of:

a mounting height of a luminaire;

a spacing length between two adjacent luminaires; and an overhang length of a luminaire.

In an example, the computing device further comprises a human-machine interface arranged for sending an alarm when a result of the evaluating step shows that the lighting quality does not meet specified requirements.

The lighting system can adopt an approaches to evaluate the lighting quality. Specifically, parameters used for evaluating the lighting quality are calculated based on the obtained tilt angles, which can give clear and straightforward indication as to the lighting quality. Moreover, an alarm may be raised when the lighting quality fails to meet the specified requirements, which allows adjustment necessary for improved degraded lighting quality to may be determined and made based on the calculated parameters.

In a third aspect of the present disclosure there is provided a computing device arranged for evaluating lighting quality in a geographic region having a plurality of luminaires arranged therein, each luminaire comprising a tilt sensor arranged for obtaining a tilt angle of said luminaire, the computing device comprising:

a receiving device arranged for receiving tilt angles of the plurality of luminaires obtained by tilt sensors of the plurality of luminaires, and an evaluating device arranged for evaluating lighting quality in the geographic region with reference to a number of parameters derived from the received tilt angles of the plurality of luminaires.

In a fourth aspect of the present disclosure there is provided a computer program product, comprising a computer readable medium storing instructions which, when executed on at least one processor, cause at least one processor to operate a computing device in accordance with the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

The present disclosure is detailed below with reference to a road lighting system having luminaires arranged along a road. It will be understood by those skilled in the art that the present disclosure is also applicable to other lighting systems such as lighting systems for parks, arenas, airports and so on.

The terms “luminaire”, “lighting device”, “lighting fixture” are used interchangeably in the description.

Figure 1:
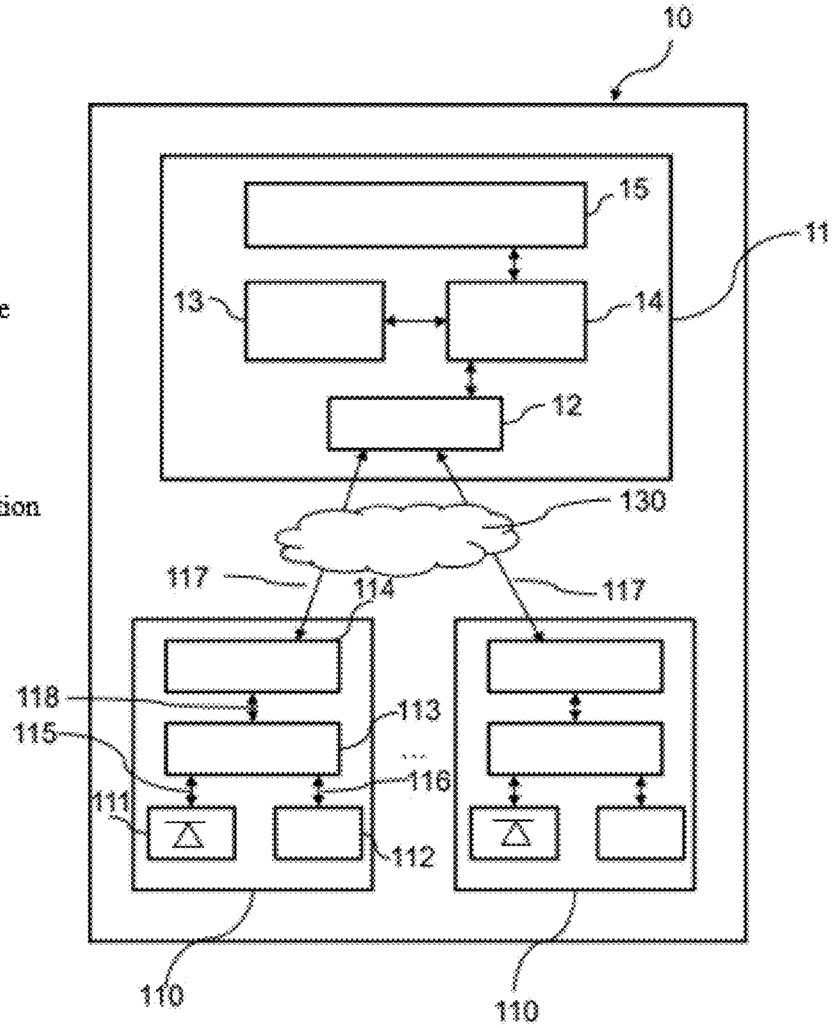
FIG. 1 illustrates, in a schematic diagram, a road lighting system provided with lighting quality evaluation or monitoring function in accordance with an example of the present disclosure.

FIG. 1 illustrates, in a schematic diagram, a road lighting system 10 provided with lighting quality evaluation or monitoring function in accordance with an example of the present disclosure.

The road lighting system 10 comprises a computing device 11 and a plurality of luminaires 110 arranged in a geographic region, such as along a road or in an open space like a park or an arena.

Each luminaire 110 comprises a lighting unit 111, a tilt sensor 112, a control unit and driver 113, and a communication unit 114.

The lighting unit 111, which is for example a Light Emitting Diode, LED, lighting module or a plurality of LED lighting modules, is connected to 115 and operates under the control of the control unit and driver 113. The tilt sensors 112 is also connected to 116 and operates under the control of the control unit and driver 113.

The control unit and driver 113 may comprise at least one microprocessor or controller, at least one data repository or storage or memory and a driver for supplying electricity to the lighting unit 111 and the tilt sensor 112.

The communication unit 114 comprises a short range communication module arranged for inter-node communications and optionally a long range communication module arranged for long range communication 117 with the backend server 11, over for example internet 130.

The long range communication interface typically operates according to a mobile communication system technology in a licensed frequency band, such as 2G/3G/4G/5G cellular communication, and other long-range wireless communication technologies, such as known as Long Range Wide Area Network, LoRaWAN, and Narrowband IoT, NB-IoT, communication, for example. However, the long range communication interface may also operate according to a proprietary wireless communication protocol or technology.

The short range communication module operates according to network protocols for exchanging data by networked devices or nodes, which may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

Communicative interactions 118, 115, 116 between the at least one microprocessor or controller of the control unit and driver 113 and the communication interface 114, the lighting unit 111 and the tilt sensors 112 may be performed via an internal data communication and control bus (not shown).

The tilt sensor 112 is arranged for measuring or detecting, among others, tilt angles of the luminaire 110. The detected tilt angle of the luminaire 110 is transmitted to the backend server 11 by way of the communication unit 114 via internet or wireless cellular network 130.

The tilt angle of a luminaire 110 may be transmitted to the backend server 11 directly via a long range communication interface of the luminaire 110, if the communication unit 114 of the luminaire 110 has long range communication capability. Alternatively, the tilt angle of a luminaire 110 may be transmitted to the backend server 11 via a proxy luminaire with long range communication capability. In this case, the tilt angle of the luminaire 110 is first communicated to the proxy luminaire via inter-node communication using the short range communication module of the communication unit 114 and then transmitted from the proxy luminaire to the backend server 11 via long range communication between the proxy luminaire and the backend server 11.

The computing device 11 comprises a communication unit 12 arranged for communication with the luminaires 110, such as for receiving tilt angles detected by the tilt sensors 112 of the luminaires 110.

The computing device 11 further comprises an evaluating device or a decision making unit 13, a database 14 and a human-machine interface 15.

The computing device 11 may be for example a backend server arranged for controlling and managing the lighting system 10. The computing device may also be an electronic device separate form a backend server of the lighting system 10. The electronic device may be a portable or mobile device which can be used to evaluate the lighting quality of the lighting system 10 on site, allowing necessary maintenance and repairing to be performed more efficiently when it is determined that the lighting quality short of requirements.

The evaluating device 13 of the computing device 11 is arranged for evaluating lighting quality in a specific geographic region having a plurality of luminaires 110 arranged therein.

The evaluating device 13 makes use of tilt angels detected by the tilt sensors 110 of the luminaires and data available in the database 14 to decide if the lighting quality in the geographic regions can meet requirements as specified by related standards and regulations.

The database 114 stores various information including such as parameters and settings of the luminaires 110 and the received tilt angles of the luminaires 110.

In the case that the evaluating device 13 determines that the lighting quality in the geographic region fails to meet the requirements, the human-machine interface 15 gives an alert by way of a text or an audio message, for example.

Figure 2A:
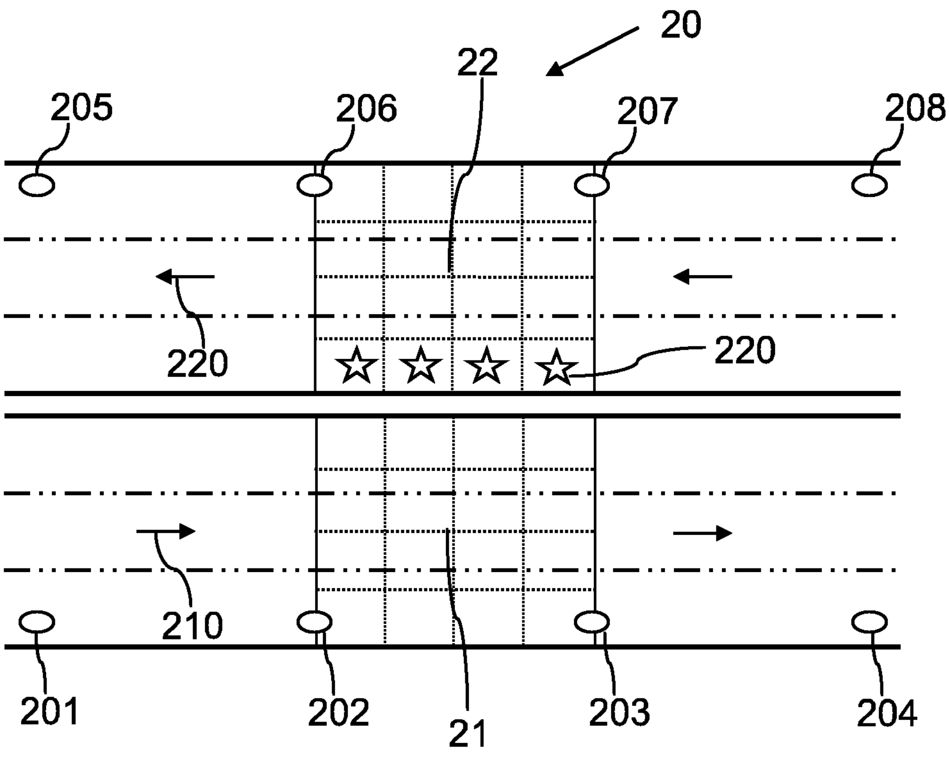
FIG. 2*a* schematically illustrates a top view of an exemplary road lighting installation, for which lighting quality of two regions is evaluated in accordance with the present disclosure.
Figure 2B:
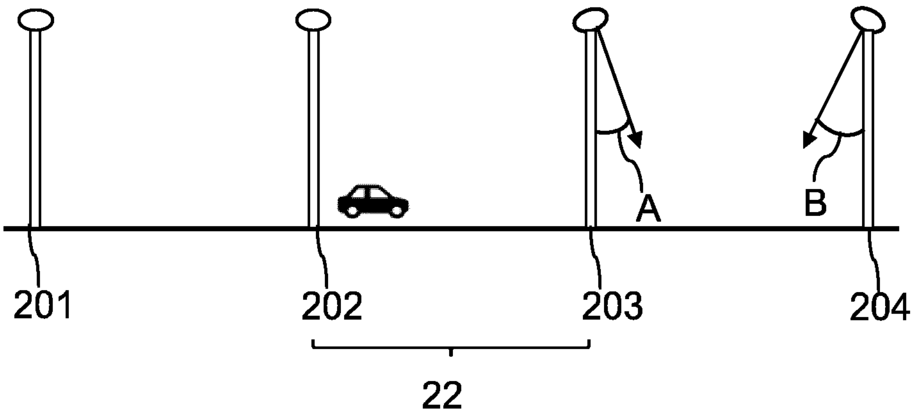
FIG. 2*b* schematically illustrates a side view of the road lighting installation of FIG. 2*a*.

FIGS. 2*a* and 2*b* illustrate geographic regions to be evaluated in terms of respective lighting quality in a road lighting system. FIG. 2*a* schematically illustrates a top view of an exemplary road lighting installation 20, for which lighting quality of two regions will be evaluated, in accordance with the present disclosure. FIG. 2*b* schematically illustrates a side view of the road lighting installation of FIG. 2*a*.

The road lighting installation 20 is illustrated to comprise eight luminaires 201-208 installed respectively on two sides of a dual carriageway road, with driving directions respectively indicated by arrows 210 and 220. An evaluation area or regions 21 is defined between luminaries 202 and 203, and another evaluation area 22 is defines between luminaires 206 and 207.

A geographic region to be evaluated in terms of the lighting quality is partitioned into a number of evaluation or calculation points as indicated as exemplary stars 220 in the region 22. The number of calculation points may be selected based on criteria known to those skilled in the art.

The schematic side view of the luminaires installed close to or around the evaluation area 21 as illustrated in FIG. 2*b* shows that tilt angles are present to some of the luminaires, which may be detected by a tilt sensor provided with each luminaire. In FIG. 2*b*, the luminaires 203 and 204 are illustrated to tilt from the light pole respectively by angles A and B.

Figure 3:
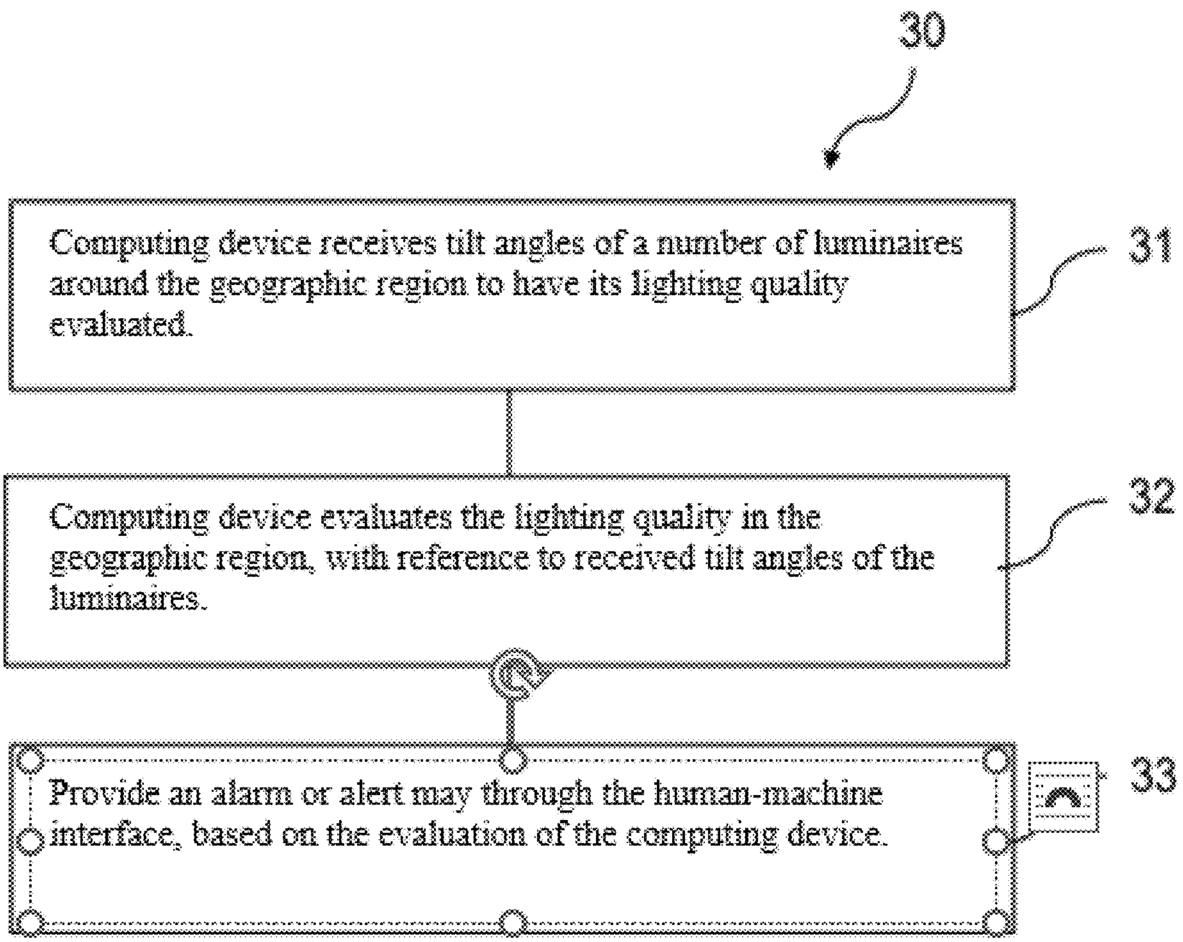
FIG. 3 illustrates, in a simplified flow chart diagram, steps of a method of evaluating lighting quality in a geographic region having a plurality of luminaires arranged or installed therein, in accordance with the present disclosure.

FIG. 3 illustrates, in a simplified flow chart diagram, steps of a method 30 of evaluating lighting quality in a geographic region having a plurality of luminaires arranged or installed therein, in accordance with the present disclosure. The method 30 is performed by the computing device 11 as illustrated in FIG. 1 and described with reference to the evaluation area 21 of FIGS. 2*a* and 2*b*.

When the computing device is an electronic device different than and separate from the backend server of the lighting system, it receives all data needed for evaluating the lighting quality in the geographic region, for example directly from the backend server, or partly from the backend server and partly from the luminaires, and then performs the evaluation according to the steps of the method 30.

The inventive method of the present disclosure is based on the idea that lighting quality in a geographic region, such as on a road, may be evaluated by calculating a number of parameters used for evaluating lighting quality based on tilt angles of luminaires considered. Various parameters may be used, depending on factors such as requirements specified by regional standards, efficiency of the lighting system and the like.

As an example, according to standards such as CIE standard: CIE-140 Road lighting calculations, European standard: EN-13201 Road lighting, and Chinese standard: Standard for lighting design of urban road, which are incorporated herein by reference, the following parameters may be used:

Average road surface luminance ($L_{avg}$): Luminance of the road surface averaged over the carriageway.

Average road surface illuminance ($E_{avg}$): Horizontal illuminance of the road surface averaged over the carriageway.

Overall uniformity of road surface luminance ($U_o$): Ratio of the lowest luminance of the road surface to the average road surface luminance.

Longitudinal uniformity of road surface luminance ($U_L$): Lowest of the ratios determined for each driving lane of the carriageway as the ratio of the lowest to the highest road surface luminance found in a line in the center along the driving line.

Uniformity of road surface illuminance ($U_E$): Ratio of the lowest illuminance of the road surface to the average road surface illuminance.

Threshold increment (TI): A percentage increase of contrast of an object that is needed to make it stay at threshold visibility in presence of disability glare generated by luminaires of a road lighting installation. It is a measure of the loss of visibility caused by the disability glare of the luminaires of a road lighting installation.

Surround ratio (SR): Lighting confined to the carriageway is inadequate for revealing the immediate surrounds of the road and revealing road users at the curb. Surround ratio is an average illuminance on strips just outside the edges of the carriageway in proportion to the average illuminance on the strips just inside the edges. It is a measure of lighting of surroundings.

It is recognized that lighting quality of a road has a strong relationship with luminaire tilt angles. Whether the lighting quality of a geographic region meets the requirements is not only affected by a tilt angle of one single luminaire but by tilt angles of a number of luminaires present in, adjacent to or around the geographic region. This is due to a superimposed influence effect from the tilt angles of several adjacent luminaires. Allowable tilt angle threshold limits are therefore affected by the superimposition effect of the surrounding luminaires, which means the system-based lighting quality judgement or evaluation approach of the present disclosure is of high importance.

In calculating the parameters a number of luminaires to be considered is selected, which defines an evaluation region or area. Within the evaluation area a number of calculation points are determined, based on for example a required evaluation accuracy.

As an example, a boundary of an area for locating luminaires to be included in calculating the luminance at a calculation point is determined as follows:

a) boundary on either side of an observer: at least five times the mounting height on either side of the calculation points.

b) boundary furthest from the observer: at least twelves times the mounting height from the calculation point in the direction remote from the observer.

c) boundary nearest to the observer: at least five times the mounting height from the calculation point in the direction towards the observer.

The evaluation area can thus be defined and the parameters are calculated based on measured tilt angles of the luminaires in the evaluation area.

An important parameter for evaluating the lighting quality in a geographic area or region is the luminance. An exemplary formula used for calculating the luminance is as follows:

$$L = \sum_{k=1}^{n_{LU}} \frac{I_k(C, \gamma) \cdot f_M \cdot r_k(\tan\epsilon, \beta)}{H_k^2}$$

Where:

L is the maintained luminance in candelas per square meter.

k is the index of current luminaire in the summation.

$n_{LU}$ is the number of luminaires involved in the calculation.

$I_k$ is the luminous intensity in candela of the $k^{th}$ luminaire.

$f_m$ is the overall maintenance factor.

$r_k$ is the reduced luminance coefficient for the current incident light path.

$H_k$ is the mounting height of the $K^{th}$ luminaire above the surface of the road, in meters.

In the above equation, angles C and γ for calculating $I_k(C, \gamma)$, which is luminaire intensity, are calculated based on tilt angles of the considered luminaires. Specifically, angles C and y may be calculated based on luminaire tilt angles together with a location including X, Y and Z coordinates of a point where the luminance is to be calculated and a location including X, Y and Z coordinates of a luminaire.

Exemplary simplified equations that may be used to calculate the angles are as follows:

C_(n,k)=f(Xp_nth,Yp_nth,Zp_nth,Xlamp_kth,Ylamp_kth,Zlamp_kth,tilt angle_kth).

γ_(n,k)=g(Xp_nth,Yp_nth,Zp_nth,Xlamp_kth,Ylamp_kth,Zlamp_kth,tilt angle_kth).

where Xp_nth, Yp_nth and Zp_nth represent the position of a n_th point where the luminance is to be calculated, and Xlamp_kth, Ylamp_kth and Zlamp_kth represent the position of a k_th luminaire which is considered for the calculation, and tilt angle_kth is the tilt angle of the k_th luminaire.

Luminaire intensity is further used for calculation of other road lighting parameters such as illuminance, threshold increment and surround ratio.

The steps of the method 30 are described in detail in the following.

At step 31, the computing device 11 receives tilt angles of a number of luminaires around the geographic region to have its lighting quality evaluated. The tilt angles of the luminaires are detected by respective tilt sensors provided with the luminaires and received for example by way of the communication unit 12 of the backend server 11 and then passed to the evaluating device 14 of the backend server 11.

In FIG. 2*a*, tilt angles of luminaires 201 to 208 are received, which means that four luminaires in a longitudinal direction on each side of the road are considered in evaluating the lighting quality in the evaluation area 21.

It can be understood by those skilled in the art that considering four luminaires in evaluating the lighting quality in the geographic region is for illustrative purpose only. In practice the number of luminaires considered for lighting quality evaluation can be selected based on different requirements, including calculation accuracy requirements and specific parameters to be calculated.

Generally speaking, to obtain a relatively accurate calculation result, at least four luminaires in longitudinal direction on each side of a road are needed; normally six luminaires are considered. When calculating the threshold increment, all luminaires within five hundred meters from an observer may have to be considered.

At step 32, the backend server 11, specifically the evaluating device 14 of the backend server 11, evaluates the lighting quality in the geographic region 21, with reference to received tilt angles of the luminaires 201 to 204.

In accordance with the present disclosure, precise and detailed evaluation of the lighting quality is obtained by computing a number of parameters, such as those described above, for deciding the lighting quality, based on the received tilt angles of the luminaires, and then comparing the calculated parameters with respective reference values available from known standards and specifications.

The calculated parameters normally include lighting level indicators such as luminance and illuminance, uniformity indicators such as average overall uniformity, longitudinal uniformity and so on. The threshold increment and surround ratio may also be considered.

It can be understood by those skilled in the art that other parameters may be considered based on other standards.

As an example, Table 1 lists three different cases with luminaires having different tilt angles. Table 2 shows a number of parameters calculated based on each case as illustrated in Table 1.

TABLE 1

Luminaire tilt angle alongside roadways exemplary cases

| Case | Luminaire 203 | Luminaire 204 | Other luminaires |
|---|---|---|---|
| 1 | 0° | 0° | 0° |
| 2 | +3° | 0° | 0° |
| 3 | −1.1° | +1.1° | 0° |

In Table 1, case 1 is an initial scenario of where all luminaires have no tilt angles along the road, which is the settings determined during road lighting design and simulation. With case 2, a single luminaire 203 is tilt by +3° with respective to the light pole. A positive tilt angle as used herein is an angle between an optical axis of the luminaire and the light pole, looked at in the driving direction of a vehicle, for example. With the third case, two luminaires, that is, the luminaire 203 and the luminaire 204 are respectively tilt by −1.1° and +1.1° from their respective poles.

TABLE 2

Road lighting quality calculation results for evaluation area 22 under different exemplary cases

| Parameter | Definitions | Requirements | Case 1 | Case 2 | Case 3 |
|---|---|---|---|---|---|
| $L_{avg}$ | Average road surface luminance (cd/m2) | ≥1.5 | 1.71 | 1.67 | 1.68 |
| $E_{ave}$ | Average road surface illuminance (lux) | ≥20 | 29.2 | 29.3 | 29.1 |
| $U_o$ | Overall uniformity of road surface luminance | ≥0.4 | 0.58 | 0.57 | 0.57 |
| $U_L$ | Longitudinal uniformity of road surface luminance | ≥0.7 | 0.79 | 0.69 | 0.69 |
| $U_E$ | Uniformity of road surface illuminance | ≥0.4 | 0.64 | 0.64 | 0.64 |
| TI | Threshold increment (%) | ≤10 | 9.1 | 9.3 | 9.3 |
| SR | Surround ratio | ≥0.5 | 0.52 | 0.52 | 0.52 |

Parameters for evaluating the lighting quality as indicated in Table 2 are calculated for each of the cases of Table 1.

It is seen from Table 2 that one important road lighting quality evaluation parameter, $U_L$, that is, longitudinal uniformity of road surface luminance is affected by the tilted luminaires of cases 2 and 3. Specifically, values of this parameter of both case 2 and case 3 are below the required value.

A tilt angle of 3 degree of case 2, which is not large and may occur during luminaires installation or the usage lifetime, will negatively influence the lighting quality as to lead to un-qualifying lighting quality. Tilt angles of −1.1 degree and +1.1 degree of case 3 together may also generate large impact on the lighting quality, due to superimposed effect.

It is therefore very important for the lighting system to monitor and evaluate the lighting quality during the operational stage after installation of the luminaires. In the case of the presence of any dissatisfactory lighting quality in a certain geographic region, at step 33, an alarm or alert may be given through the human-machine interface. Necessary maintenance and repair may thereafter be performed accordingly.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of evaluating lighting quality in a geographic region having a plurality of luminaires arranged therein, each luminaire comprising a tilt sensor arranged for obtaining a tilt angle of said luminaire, the method performed by a computing device and comprising the steps of:

receiving tilt angles of said plurality of luminaires obtained, via a communication device, obtained by tilt sensors of said plurality of luminaires, and evaluating lighting quality in said geographic region, via an evaluating device, with reference to a number of parameters derived from said received tilt angles of said plurality of luminaires;

wherein said number of parameters comprises at least one of the following parameters:

one or more lighting level indicators;

one or more lighting uniformity indicators, a threshold increment, and a surround ratio;

wherein said step of evaluating comprises:

calculating said number of parameters based on said received tilt angles of said plurality of luminaires and geographic settings and other luminaire installation settings, and comparing said calculated number of parameters with respective reference values of said parameters.

2. The method according to claim 1, wherein said geographic settings and other luminaire installation settings are pre-stored in an evaluation device or available from another device storing said road settings and other luminaire installation settings.

3. The method according to claim 1, wherein said geographic settings comprise at least one of:

a road carriageway number;

a central reserve width; and a number of lanes;

said other luminaire installation settings comprise at least one of:

a mounting height of a luminaire;

a spacing length between two adjacent luminaires; and an overhang length of a luminaire.

4. The method according to claim 1, wherein said evaluating step is performed for a number of selected evaluation points in said geographic region.

5. The method according to claim 1, further comprising the step of:

sending an alarm when a result of said evaluating step shows that said lighting quality does not meet specified requirements.

6. A computer program product, comprising a computer readable medium storing instructions which, when executed on at least one processor, cause said at least one processor to operate a computing device in accordance with the method of claim 1.

7. A computing device arranged for evaluating lighting quality in a geographic region having a plurality of luminaires arranged therein, each luminaire comprising a tilt sensor arranged for obtaining a tilt angle of said luminaire, the computing device comprising:

a communication device arranged for receiving said tilt angles of said plurality of luminaires obtained by said tilt sensors;

an evaluating device arranged for evaluating lighting quality in said geographic region with reference to a number of parameters derived from said received tilt angles of said plurality of luminaires;

wherein said number of parameters comprises at least one of the following parameters:

one or more lighting level indicators;

one or more lighting uniformity indicators, a threshold increment, and a surround ratio;

wherein said evaluating device is arranged for evaluating lighting quality in said geographic region with reference to a number of parameters derived from said received tilt angles of said plurality of luminaires by:

calculating said number of parameters based on said received tilt angles of said plurality of luminaires and road settings and other luminaire installation settings, and comparing said calculated number of parameters with respective reference values of said parameters.

8. The computing device according to claim 7, wherein said geographic settings and other luminaire installation settings are pre-stored in said evaluation device or available from another device storing said road settings and other luminaire installation settings.

9. The computing device according to claim 7, wherein said geographic settings comprise at least one of:

a road carriageway number;

a central reserve width; and a number of lanes;

said other luminaire installation settings comprise at least one of:

a mounting height of a luminaire;

a spacing length between two adjacent luminaires; and an overhang length of a luminaire.

10. The computing device according to claim 7, wherein said evaluation step performed by said evaluating device is for a number of selected evaluation points in said geographic region.

11. The computing device according to claim 7, wherein said computing device further comprises a human-machine interface arranged for sending an alarm when an evaluation result of said evaluating device shows that said lighting quality does not meet specified requirements.

12. A road lighting system comprising:

a plurality of luminaires arranged in a geographic region, each luminaire comprising a tilt sensor arranged for obtaining a tilt angle of said luminaire; and a computing device according to claim 7.

* * * * *